(12) United States Patent
Lin et al.

(10) Patent No.: US 11,105,492 B2
(45) Date of Patent: Aug. 31, 2021

(54) BACKLIGHT MODULE AND DISPLAY DEVICE

(71) Applicants: K-Tronics (Suzhou) Technology Co., Ltd., Jiangsu (CN); BOE TECHNOLOGY GROUP CO., LTD., Beijing (CN)

(72) Inventors: Lianzhang Lin, Beijing (CN); Wei Huang, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,042

(22) Filed: Mar. 20, 2020

(65) Prior Publication Data
US 2021/0131645 A1 May 6, 2021

(30) Foreign Application Priority Data
Oct. 31, 2019 (CN) .......................... 201921860822.1

(51) Int. Cl.
| G02F 1/1333 | (2006.01) |
| F21V 15/01 | (2006.01) |
| F21V 3/02 | (2006.01) |
| F21V 7/00 | (2006.01) |
| G02F 1/13357 | (2006.01) |

(52) U.S. Cl.
CPC ................ *F21V 15/01* (2013.01); *F21V 3/02* (2013.01); *F21V 7/00* (2013.01); *G02F 1/133317* (2021.01); *G02F 1/133606* (2013.01); *G02F 1/133608* (2013.01)

(58) Field of Classification Search
CPC ......... G02F 1/133606; G02F 1/133608; G02F 1/133317; F21V 15/01; F21V 3/02; F21V 7/00
See application file for complete search history.

(56) References Cited

U.S. PATENT DOCUMENTS

| 6,835,961 B2 * | 12/2004 | Fukayama | .......... G02F 1/13452 257/84 |
| 7,481,569 B2 * | 1/2009 | Chang | ............... G02F 1/133608 362/300 |

(Continued)

*Primary Examiner* — Arman B Fallahkhair
(74) *Attorney, Agent, or Firm* — Westman, Champlin & Koehler, P.A.

(57) ABSTRACT

The present disclosure provides a backlight module and a display device. In one embodiment, a backlight module includes a back plate, a plastic frame, and a membrane provided between the back plate and the plastic frame. The back plate has a bearing surface for supporting a membrane, a back plate hanger being protruded from the bearing surface. The plastic frame has: a pressing surface for pressing the membrane against the back plate, and a support surface substantially perpendicular to the pressing surface. A membrane hanging hole for fitting the back plate hanger therein is formed at a margin of the membrane, and the back plate hanger is fitted in the membrane hanging hole. The back plate hanger has an outwardly convex arc-shaped surface facing towards the support surface, and the membrane hanging hole has an inwardly curved arc-shaped stressed surface that matches the outwardly convex arc-shaped surface.

14 Claims, 2 Drawing Sheets

(56) References Cited

U.S. PATENT DOCUMENTS

| | | | |
|---|---|---|---|
| 8,550,688 B2* | 10/2013 | Seo | G02F 1/133608 |
| | | | 362/633 |
| RE46,795 E* | 4/2018 | Go | G02B 6/009 |
| RE47,135 E* | 11/2018 | Kim | G02B 6/0085 |
| 2003/0223020 A1* | 12/2003 | Lee | G02B 6/0088 |
| | | | 349/58 |
| 2005/0254236 A1* | 11/2005 | Fu | G02F 1/133608 |
| | | | 362/186 |
| 2006/0007367 A1* | 1/2006 | Cho | G02F 1/133308 |
| | | | 349/58 |

* cited by examiner

BACKLIGHT MODULE AND DISPLAY DEVICE

CROSS-REFERENCE TO RELATED APPLICATION

This application claims priority to Chinese Patent Application No. 201921860822.1 filed on Oct. 31, 2019 in the State Intellectual Property Office of China, the disclosure of which is hereby incorporated by reference in its entirety.

TECHNICAL FIELD

The present disclosure generally relates to the field of display technology, and particularly, to a backlight module and a display device.

BACKGROUND

Most of the liquid crystal display devices currently in the market are backlight type liquid crystal display devices, which includes a liquid crystal panel and a backlight module.

SUMMARY

According to an aspect of the present disclosure, there is provided a backlight module comprising: a back plate having a bearing surface for supporting a membrane, a back plate hanger being protruded from the bearing surface; a plastic frame having: a pressing surface for pressing the membrane against the back plate, and a support surface substantially perpendicular to the pressing surface; and a membrane provided between the back plate and the plastic frame, wherein a membrane hanging hole for fitting the back plate hanger therein is formed at a margin of the membrane, and the back plate hanger is fitted in the membrane hanging hole; and wherein the back plate hanger has an outwardly convex arc-shaped surface facing towards the support surface of the plastic frame, and the membrane hanging hole has an inwardly curved arc-shaped stressed surface that matches the outwardly convex arc-shaped surface.

In some embodiments, the back plate hanger and the membrane hanging hole are in a clearance fit.

In some embodiments, the fit clearance between the back plate hanger and the membrane hanging hole is about 0.5 mm to about 1 mm.

In some embodiments, the membrane hanging hole further has a first non-stressed surface opposite to the inwardly curved arc-shaped stressed surface, and the inwardly curved arc-shaped stressed surface is transited continuously to the first non-stressed surface through a circular arc transition.

In some embodiments, the first non-stressed surface is a flat surface or a curved surface.

In some embodiments, the back plate hanger further has a second non-stressed surface facing away from the outwardly convex arc-shaped surface, and the second non-stressed surface is a flat surface or a curved surface.

In some embodiments, two opposite margins of the back plate are respectively provided with one said plastic frame, the membrane is pressed against the back plate by the pressing surfaces of the two plastic frames, and the support surfaces of the two plastic frames are set to face towards each other, and the membrane is located between the support surfaces of the two plastic frames.

In some embodiments, the backlight module further comprises: a reflection sheet provided on a side of the membrane facing towards the bearing surface of the back plate; and a diffusion plate provided on a side of the reflection sheet facing towards the membrane.

According to another aspect of the present disclosure, there is provided a display device comprising the backlight module of any one of the abovementioned embodiments.

In some embodiments, in the backlight module, the back plate hanger and the membrane hanging hole are in a clearance fit.

In some embodiments, in the backlight module, the fit clearance between the back plate hanger and the membrane hanging hole is about 0.5 mm to about 1 mm.

In some embodiments, in the backlight module, the membrane hanging hole further has a first non-stressed surface opposite to the inwardly curved arc-shaped stressed surface, and the inwardly curved arc-shaped stressed surface is transited continuously to the first non-stressed surface through a circular arc transition.

In some embodiments, in the backlight module, the first non-stressed surface is a flat surface or a curved surface.

In some embodiments, in the backlight module, the back plate hanger further has a second non-stressed surface facing away from the outwardly convex arc-shaped surface, and the second non-stressed surface is a flat surface or a curved surface.

In some embodiments, in the backlight module, two opposite margins of the back plate are respectively provided with one said plastic frame, the membrane is pressed against the back plate by the pressing surfaces of the two plastic frames, and the support surfaces of the two plastic frames are set to face towards each other, and the membrane is located between the support surfaces of the two plastic frames.

In some embodiments, the backlight module further comprises: a reflection sheet provided on a side of the membrane facing towards the bearing surface of the back plate; and a diffusion plate provided on a side of the reflection sheet facing towards the membrane.

BRIEF DESCRIPTION OF THE DRAWINGS

Other features, objects, and advantages of the present disclosure will become more apparent by reading the detailed description of the non-limiting embodiments made with reference to the following drawings:

FIG. 1 is a schematic force diagram of a membrane hanger in related art;

FIG. 2 is a schematic view showing a partial structure of a backlight module according to an embodiment of the present disclosure;

FIG. 3 is a schematic view showing a structure of a membrane according to the embodiment of the present disclosure; and FIG. 4 is a schematic force diagram of a membrane hanger according to the embodiment of the present disclosure.

DETAILED DESCRIPTION OF THE EMBODIMENTS

In the related art, as shown in FIG. 1, a membrane 1 in a backlight module is connected and fixed by a back plate hanger 2. The back plate hanger 2 is a strip-shaped panel protruding from the back plate, and a hanger of the membrane 1 is provided with a connection hole 3 matching the back plate hanger 2. The connection hole 3 in FIG. 1 is roughly a waist-shaped hole. In addition, the connection hole 3 can also be designed as a rectangular hole, as long as it can be matched with the back plate hanger. Connection and fixation of the membrane can be achieved by inserting the back plate hanger 2 into the connection hole 3 of the membrane 1.

Figure 1:
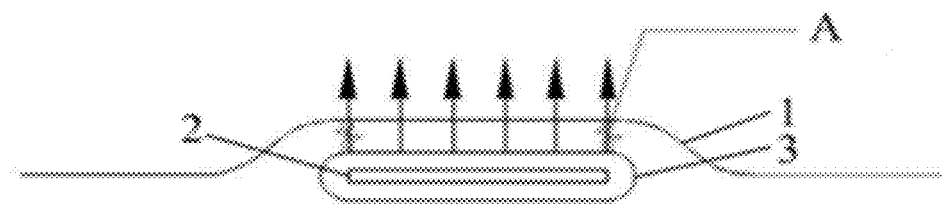

During transportation of the display device, bumps will cause the device body to vibrate. The direction of stress at the connection between the membrane hanger and the back plate in the backlight module is shown by the arrow in FIG. 1, which causes the stress on the membrane hanger to be concentrated. Refer to the part indicated by A in FIG. 1, due to stress concentration, the membrane hanger tends to be damaged and severely may be broken.

The present disclosure is further described in detail below with reference to the drawings and embodiments. It can be understood that the specific embodiments described herein are only used to explain the present disclosure, but not to limit the present disclosure. It should also be noted that, for convenience of description, only the parts related to the present disclosure are shown in the drawings.

It should be noted that, in the case of no conflict, the embodiments in the present disclosure and the features in the embodiments can be combined with each other. The disclosure will be described in detail below with reference to the drawings and embodiments.

Figure 2:
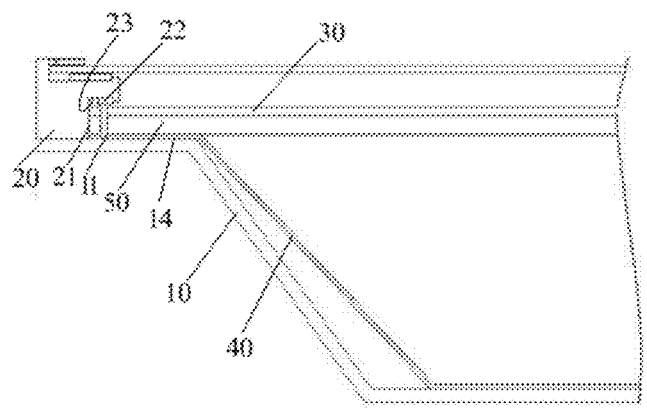
Figure 3:
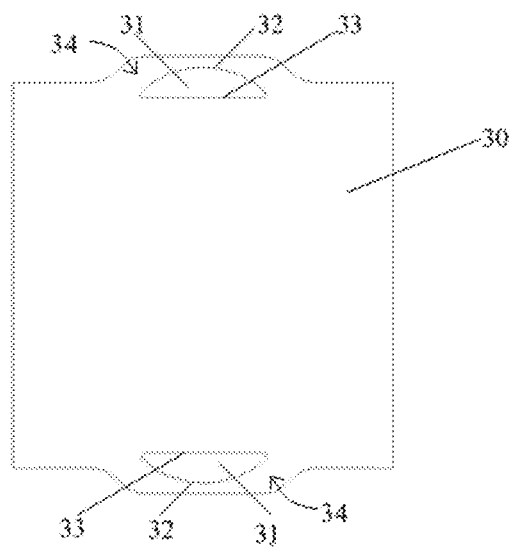
Figure 4:
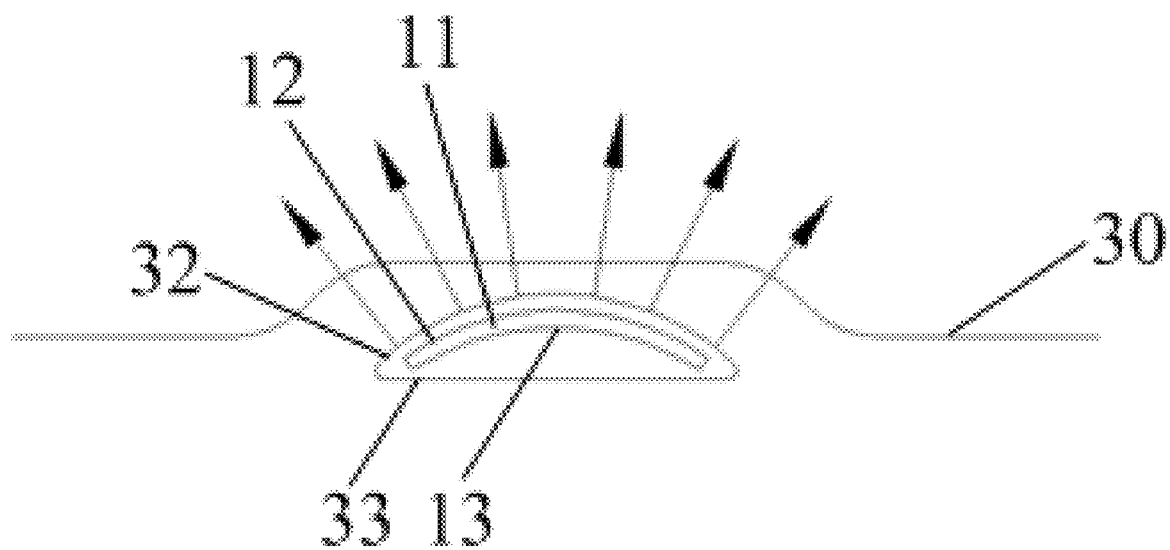

Referring to FIG. 2 to FIG. 4, in an embodiment of the present disclosure, there is provided a backlight module. The backlight module comprises a back plate 10, a plastic frame 20 and a membrane 30 provided between the back plate 10 and the plastic frame 20. The back plate 10 has a bearing surface 14 for supporting the membrane 30, and a back plate hanger 11 is protruded from the bearing surface 14. The plastic frame 20 has a pressing surface 23 for pressing the membrane 30 against the back plate 10 and a support surface 21 substantially perpendicular to the pressing surface. A membrane hanging hole 31 for fitting the back plate hanger 11 therein is formed at a margin of the membrane 30, and the back plate hanger 11 is fitted in the membrane hanging hole 31. The back plate hanger 11 has an outwardly convex arc-shaped surface 12 facing towards the support surface 21 of the plastic frame 20, and the membrane hanging hole 31 has an inwardly curved arc-shaped stressed surface 32 that matches the outwardly convex arc-shaped surface 12.

In the above backlight module, a part of the membrane 30 which is located on the pressing surface 23 of the plastic frame 20 and the bearing surface of the back plate 10 is provided with the membrane hanging hole 31. The bearing surface 14 of back plate 10 is provided with the back plate hanger 11. The back plate hanger 11 passes through the membrane hanging hole 31. As a result, the membrane 30 is fixed to the back plate 10 and/or the plastic frame 20 through the fitting between the membrane hanging hole 31 and the back plate hanger 11.

The membrane 30 has a membrane hanger 34, and the membrane hanger 34 is provided with a membrane hanging hole 31. The membrane hanger 34 is located between the pressing surface 23 of the plastic frame 20 and the bearing surface 14 of the back plate 10. The plastic frame 20 has the pressing surface 23 and the support surface 21 substantially perpendicular to the pressing surface 23, the margin of the membrane 20 is located inside the support surface 21. The back plate hanger 11 has an outwardly convex arc-shaped surface 12 facing towards the support surface 21, and the membrane hanging hole 31 has an inwardly curved arc-shaped stressed surface 32 that matches the outwardly convex arc-shaped surface 12. During transportation of the display device, the membrane 30 in the display device will be supported by the back plate hanger 11 in a direction approximately perpendicular to the support surface 21. Through the matching between the outwardly convex arc-shaped surface 12 and the inwardly curved arc-shaped stressed surface 32, the contact area between the back plate hanger 11 and the membrane hanging hole 31 can be effectively increased, which effectively disperses the stress subjected by the membrane, thereby reducing the stress in a unit area of the membrane, and effectively avoiding the problem that the membrane hanger tends to be damaged or broken due to the vibration of the display device.

As shown in FIG. 2, a lower rubber strip 22 is further provided at the pressing surface of the plastic frame 20, which presses the membrane 30 between the plastic frame 20 and the back plate 10.

In an embodiment, the back plate hanger 11 and the membrane hanging hole 31 are in a clearance fit. In order to prevent arching of the membrane due to thermal expansion when the backlight module is under normal temperature for a long time which adversely affect the picture quality, a proper clearance fit should be provided between the membrane hanging hole and the back plate hanger during the design.

In an embodiment, the fit clearance between the back plate hanger 11 and the membrane hanging hole 31 is about 0.5 mm to about 1 mm, which ensures a proper fit clearance between the membrane hanging hole and the back plate hanger.

In an embodiment, the membrane hanging hole further has a first non-stressed surface 33 opposite to the inwardly curved arc-shaped stressed surface 32, and the inwardly curved arc-shaped stressed surface 32 is transited continuously to the first non-stressed surface 33 through a circular arc transition. This reduces the stress at the connection between the inwardly curved arc-shaped stressed surface and the first non-stressed surface.

In an embodiment, since the stress subjected by the membrane hanger is mainly concentrated in the inwardly curved arc-shaped stressed surface, the first non-stressed surface 33 can be a flat surface or a curved surface.

In an embodiment, the back plate hanger 11 further has a second non-stressed surface 13 facing away from the outwardly convex arc-shaped surface 12, and the second non-stressed surface can be a flat surface or a curved surface.

According to the embodiments of the present disclosure, the first non-stressed surface 33 may be in contact with the second non-stressed surface 13 or may not be in contact with the second non-stressed surface 13.

In an embodiment, referring to FIG. 3, the membrane 30 has two opposite membrane hangers 34, and each membrane hanger 34 is provided with one membrane hanging hole 31. Correspondingly, two opposite margins of the back plate 10 are respectively provided with the plastic frame 20, the membrane 30 is pressed against the back plate 10 by the pressing surfaces 23 of the two plastic frames 20, and the support surfaces 21 of the two plastic frames 20 are set to face towards each other, and the membrane 30 is located between the support surfaces 21 of the two plastic frames 20. With such design, the membrane 30 is located inside the two support surfaces 21 facing towards each other, and the two plastic frames 20 make the membrane 30 stably fixed between the plastic frame 20 and the back plate 10.

According to an embodiment of the present disclosure, as shown in FIG. 2, the backlight module can further comprise: a reflection sheet 40 and a diffusion plate 50. The reflection sheet 40 is provided on a side of the membrane 30 facing towards the bearing surface 14, and the diffusion plate 50 is provided on a side of the reflection sheet 40 facing towards the membrane 30.

The reflection sheet 40 reflects the light energy escaped from the bottom surface of the back plate back to the back plate, and the diffusion plate 50 uniformizes the light.

In another aspect, the present disclosure provides a display device including the backlight module according to any one of the above embodiments. The backlight module according to any one of the above embodiments after being assembled is entirely disposed in the display device. During transportation of the display device, the membrane hanger is not easily broken due to the bumps and vibration, thereby improving the reliability of the display device. The display device may be any products or components having a display function, such as an LCD TV, a mobile phone, a tablet computer, a notebook computer display screen, an electronic paper, an OLED display panel, or a digital photo frame.

As can be seen from the above, with the backlight module and the display device including such backlight module according to the present disclosure, in the backlight module, the membrane is located between the pressing surface of the plastic frame and the bearing surface of the back plate. In the direction substantially perpendicular to the support surface (namely parallel to the pressing surface), the back plate hanger has an outwardly convex arc-shaped surface facing towards the support surface, and the membrane hanging hole that is fitted with the back plate hanger has an inwardly curved arc-shaped stressed surface that matches the outwardly convex arc-shaped surface. Through the matching between the outwardly convex arc-shaped surface and the inwardly curved arc-shaped stressed surface, the contact area between the back plate hanger and the membrane hanging hole can be effectively increased, which effectively disperses the stress subjected by the membrane hanger, thereby reducing or even avoiding the problem that the membrane hanger of the membrane tends to be damaged or broken due to the vibration of the display device.

The above description is only exemplary embodiments of the present disclosure and an explanation of the applied technical principles. Those skilled in the art should understand that the disclosed scope involved in the present disclosure is not limited to the technical solution of the specific combination of the above technical features, but also covers other technical solutions formed by arbitrarily combining the above technical features or equivalent features without departing from the disclosed concept. For example, a technical solution formed by replacing the above features disclosed in the present disclosure (but not limited to) with technical features having similar functions.

What is claimed is:

1. A backlight module, comprising: a back plate having a bearing surface for supporting a membrane, a back plate hanger being protruded from the bearing surface; a plastic frame having: a pressing surface for pressing the membrane against the back plate, and a support surface substantially perpendicular to the pressing surface; and a membrane provided between the back plate and the plastic frame, wherein a membrane hanging hole for fitting the back plate hanger therein is formed at a margin of the membrane, and the back plate hanger is fitted in the membrane hanging hole; and wherein the back plate hanger has a shape defined by an outwardly convex arc-shaped surface protruding towards the support surface of the plastic frame and a second non-stressed surface facing away from the outwardly convex arc-shaped surface, and the membrane hanging hole has an inwardly curved arc-shaped stressed surface protruding towards the support surface of the plastic frame, and wherein the inwardly-curved arc-shaped stressed surface and the outwardly convex arc-shaped surface have a same arc and match with each other; and a shape of a through-hole making up the membrane hanging hole is defined by the inwardly-curved arc-shaped stressed surface opposite to a flat first non-stressed surface.

2. A display device comprising the backlight module of claim 1.

3. The display device of claim 2, wherein in the backlight module, the back plate hanger and the membrane hanging hole are in a clearance fit.

4. The display device of claim 3, wherein in the backlight module, the fit clearance between the back plate hanger and the membrane hanging hole is about 0.5 mm to about 1 mm.

5. The display device of claim 2, wherein in the backlight module, the membrane hanging hole further has a first non-stressed surface opposite to the inwardly curved arc-shaped stressed surface, and the inwardly curved arc-shaped stressed surface is transited continuously to the first non-stressed surface through a circular arc transition.

6. The display device of claim 5, wherein in the backlight module, the first non-stressed surface is a flat surface or a curved surface.

7. The display device of claim 2, wherein in the backlight module, the back plate hanger further has a second non-stressed surface facing away from the outwardly convex arc-shaped surface, and the second non-stressed surface is a flat surface or a curved surface.

8. The display device of claim 2, wherein the backlight module further comprises:
a reflection sheet provided on a side of the membrane facing towards the bearing surface of the back plate; and
a diffusion plate provided on a side of the reflection sheet facing towards the membrane.

9. The backlight module of claim 1, wherein the back plate hanger and the membrane hanging hole are in a clearance fit.

10. The backlight module of claim 9, wherein the fit clearance between the back plate hanger and the membrane hanging hole is about 0.5 mm to about 1 mm.

11. The backlight module of claim 1, wherein the membrane hanging hole further has a first non-stressed surface opposite to the inwardly curved arc-shaped stressed surface, and the inwardly curved arc-shaped stressed surface is transited continuously to the first non-stressed surface through a circular arc transition.

12. The backlight module of claim 11, wherein the first non-stressed surface is a flat surface or a curved surface.

13. The backlight module of claim 1, wherein the back plate hanger further has a second non-stressed surface facing away from the outwardly convex arc-shaped surface, and the second non-stressed surface is a flat surface or a curved surface.

14. The backlight module of claim 1, further comprises:
a reflection sheet provided on a side of the membrane facing towards the bearing surface of the back plate; and
a diffusion plate provided on a side of the reflection sheet facing towards the membrane.

* * * * *